(12) United States Patent
Kaneko et al.

(10) Patent No.: US 6,567,616 B2
(45) Date of Patent: May 20, 2003

(54) TEMPORARY RETAINING STRUCTURE FOR LIGHT PROJECTING OR RECEIVING DEVICES OF AF APPARATUSES

(75) Inventors: Yukihiro Kaneko, Saitama-ken (JP); Mitsuo Manabe, Saitama-ken (JP)

(73) Assignee: Fuji Photo Optical Co., Ltd., Saitama-Ken (JP)

( * ) Notice: Subject to any disclaimer, the term of this patent is extended or adjusted under 35 U.S.C. 154(b) by 0 days.

(21) Appl. No.: 10/109,321

(22) Filed: Mar. 27, 2002

(65) Prior Publication Data

US 2002/0141747 A1 Oct. 3, 2002

(30) Foreign Application Priority Data

Mar. 28, 2001 (JP) ........................................ 2001-092711

(51) Int. Cl.[7] .............................................. G03B 13/36
(52) U.S. Cl. ......................................... 396/106; 396/89
(58) Field of Search ................................ 396/106, 120, 396/89

(56) References Cited

U.S. PATENT DOCUMENTS

| | | | |
|---|---|---|---|
| 5,099,112 A | 3/1992 | Kamitani et al. | ........ 250/201.6 |
| 5,659,815 A * | 8/1997 | Uematsu et al. | .......... 396/89 X |
| 5,956,534 A | 9/1999 | Onda | ........................ 396/106 |

FOREIGN PATENT DOCUMENTS

JP          63-160986          6/1988

* cited by examiner

*Primary Examiner*—W. B. Perkey
(74) *Attorney, Agent, or Firm*—Clifford Chance US LLP (57) ABSTRACT

In a camera provided with an instrument supporting frame, with which a light projecting device or a light receiving device of an automatic focusing apparatus are combined at a predetermined position, a retaining piece, which is capable of elastically pushing and holding the light projecting device or the light receiving device at the predetermined position, is formed through integral molding together with the instrument supporting frame. The device is held by the retaining piece at the predetermined position and is adhered in this state to the instrument supporting frame by use of an adhesive agent.

2 Claims, 11 Drawing Sheets

TEMPORARY RETAINING STRUCTURE FOR LIGHT PROJECTING OR RECEIVING DEVICES OF AF APPARATUSES

CROSS-REFERENCE TO RELATED APPLICATION

This application claims priority to Japanese patent application number 2001-092711 filed Mar. 28, 2001.

BACKGROUND OF THE INVENTION

1. Field of the Invention

This invention relates to a temporary retaining structure for a light projecting device or a light receiving device of an automatic focusing apparatus (hereinbelow referred to simply as the AF apparatus) of a camera. The term "light projecting device or a light receiving device" as used herein means at least either one of a light projecting device, such as an infrared light emitting diode (IRED), and a light receiving device, such as a photo position sensor device (PSD), in an active type of AF system.

2. Description of the Related Art

Small-sized cameras ordinarily referred to as compact cameras are provided with a lens barrel unit, which supports a photographing optical system. The lens barrel unit is located approximately at a center region of a front surface side of a camera main body. Also, an instrument supporting frame, which supports a photographing condition setting optical system containing an AF apparatus, a finder apparatus, and the like, is secured at a position above the lens barrel unit. In cases where the AF apparatus is of the active type, the AF apparatus is provided with an AF light projecting section and an AF light receiving section. The light projecting device, such as the IRED, is located at the AF light projecting section, and the light receiving device, such as the PSD, is located at the AF light receiving section.

If the position of the light projecting device or the light receiving device of the AF apparatus, in particular the position of the light receiving device, shifts slightly from a predetermined position, the AF functions will be affected adversely. Therefore, a high position accuracy is required of the light projecting device or the light receiving device of the AF apparatus, in particular the light receiving device. Accordingly, the cameras have heretofore been provided with a position adjusting mechanism, which is utilized for adjusting the position of the light projecting device or the light receiving device of the AF apparatus after the light projecting device or the light receiving device has been combined with the instrument supporting frame. However, due to a limitation imposed upon the cost of the camera, it is not appropriate for a low-cost camera to be provided with the position adjusting mechanism. Accordingly, a technique has heretofore been employed, wherein the accuracy, with which the light projecting device or the light receiving device is combined with the instrument supporting frame, is enhanced such that the adjustment of the position of the light projecting device or the light receiving device need not be performed, and wherein, after the light projecting device or the light receiving device has been combined with the instrument supporting frame at the predetermined position of the instrument supporting frame, the device is adhered to the instrument supporting frame by use of an adhesive agent.

However, in cases where the light projecting device or the light receiving device is secured to the predetermined position on the instrument supporting frame by use of the adhesive agent, the problems occur in that the light projecting device or the light receiving device shifts from the predetermined position due to shrinkage of the adhesive agent at the time of the hardening of the adhesive agent. Therefore, in order to eliminate the problems described above, a technique has heretofore been employed wherein, after the light projecting device or the light receiving device has been incorporated to the predetermined position on the instrument supporting frame from a back side of the instrument supporting frame, the device is held from the back side by use of a retaining member until the adhesive agent hardens, and the device is thereby prevented from shifting from the predetermined position.

However, in cases where, for example, the AF apparatus and the finder apparatus are formed together as an integral body, and a prism and an eye-piece of the finder are located on the side backward from the section for mounting the light projecting device or the light receiving device of the AF apparatus, since it becomes impossible to draw a mold toward the side backward from the instrument supporting frame at the time of a process for molding the instrument supporting frame, the temporary retaining structure in which the light projecting device or the light receiving device is held from the back side by use of the leaf spring, or the like, cannot be employed.

Also, from the view point of cost, it is not advantageous that the particular independent retaining member, such as the leaf spring, is required.

SUMMARY OF THE INVENTION

The primary object of the present invention is to provide a temporary retaining structure for a light projecting device or a light receiving device of an AF apparatus, wherein a particular independent retaining member, such as a leaf spring, need not be utilized, and the light projecting device or the light receiving device is capable of being prevented from shifting from a predetermined position during an adhering process even in the cases of a constitution, in which a prism and an eye-piece of a finder are located on the side backward from a section for mounting the light projecting device or the light receiving device.

The present invention provides a temporary retaining structure for a light projecting device or a light receiving device of an automatic focusing apparatus for use in a camera provided with an instrument supporting frame, with which a light projecting device or a light receiving device of an automatic focusing apparatus are combined at a predetermined position, wherein a retaining piece, which is capable of elastically pushing and holding the light projecting device or the light receiving device at the predetermined position, is formed through integral molding together with the instrument supporting frame.

In the temporary retaining structure for a light projecting device or a light receiving device of an automatic focusing apparatus in accordance with the present invention, the light projecting device or the light receiving device is held by the retaining piece at the predetermined position, and the light projecting device or the light receiving device is adhered in this state to the instrument supporting frame by use of an adhesive agent.

With the temporary retaining structure for a light projecting device or a light receiving device of an AF apparatus in accordance with the present invention, the retaining piece capable of elastically pushing and holding the light projecting device or the light receiving device, which is combined with the instrument supporting frame, at the predetermined position, is formed through the integral molding together with the instrument supporting frame. Therefore, a particular independent retaining member, such as a leaf spring, need not be utilized, and the light projecting device or the light receiving device is capable of being prevented from shifting from the predetermined position due to shrinkage of the adhesive agent at the time of the hardening of the adhesive agent.

Also, with the temporary retaining structure for a light projecting device or a light receiving device of an AF apparatus in accordance with the present invention, even in cases where a prism and an eye-piece of a finder are located on the side backward from the section for mounting the light projecting device or the light receiving device, the structure of the instrument supporting frame may be set such that the light projecting device or the light receiving device is combined with the instrument supporting frame from above the instrument supporting frame, and the retaining piece is thereby capable of being formed through the integral molding together with the instrument supporting frame.

DESCRIPTION OF THE PREFERRED EMBODIMENTS

The present invention will hereinbelow be described in further detail with reference to the accompanying drawings.

Figure 1:
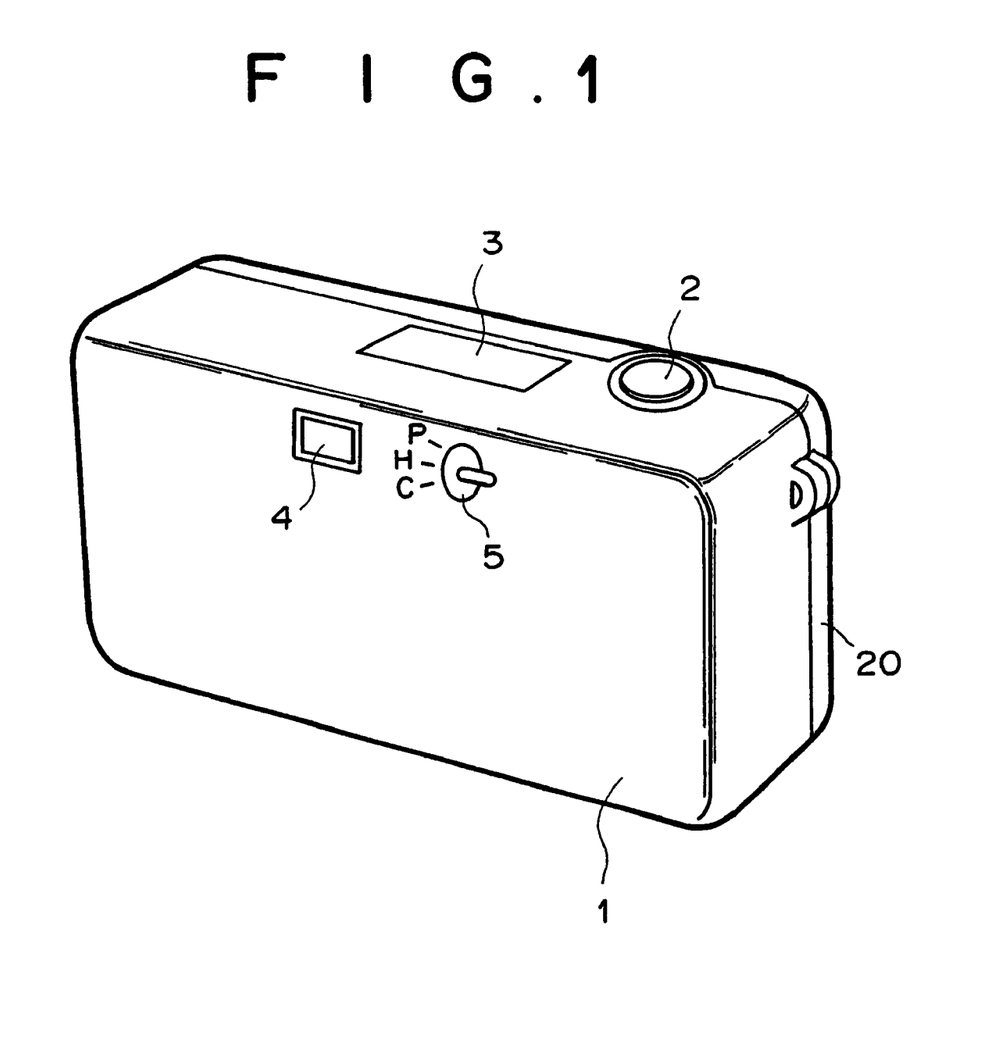
FIG. 1 is a schematic perspective rear view showing a camera, in which an embodiment of the temporary retaining structure for a light projecting device or a light receiving device of an AF apparatus in accordance with the present invention is employed.
Figure 2A:
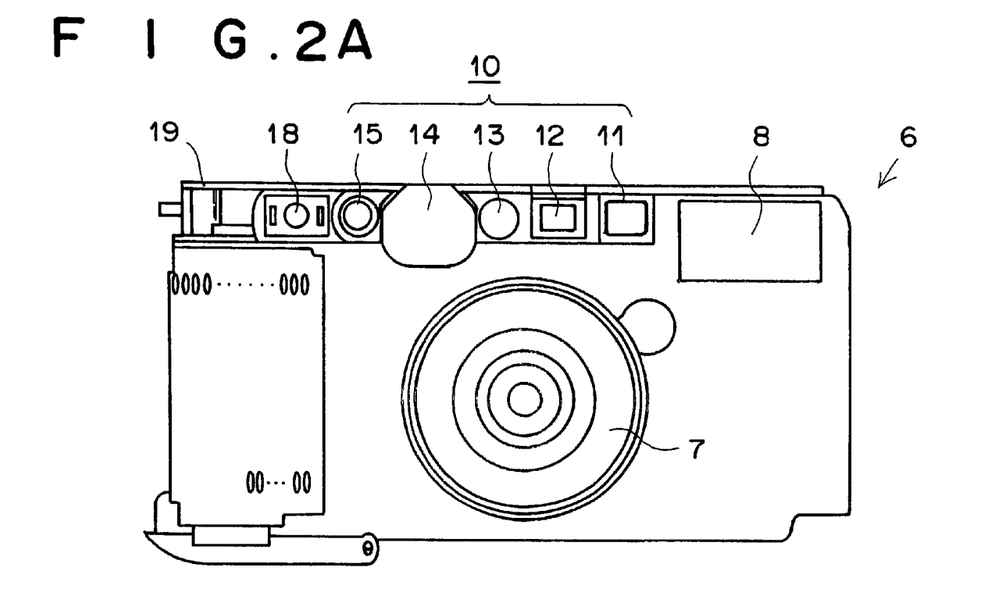
FIG. 2A is a schematic front view showing a camera main body of the camera of FIG. 1, a front cover of the camera being omitted for clearness.
Figure 2B:
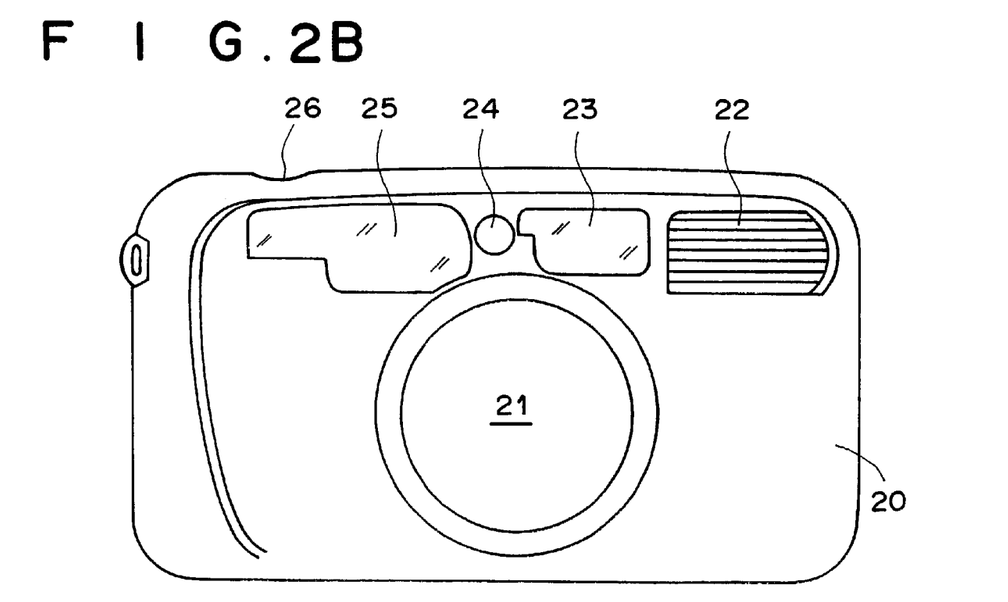
FIG. 2B is a front view of the front cover of the camera of FIG. 1.
Figure 3:
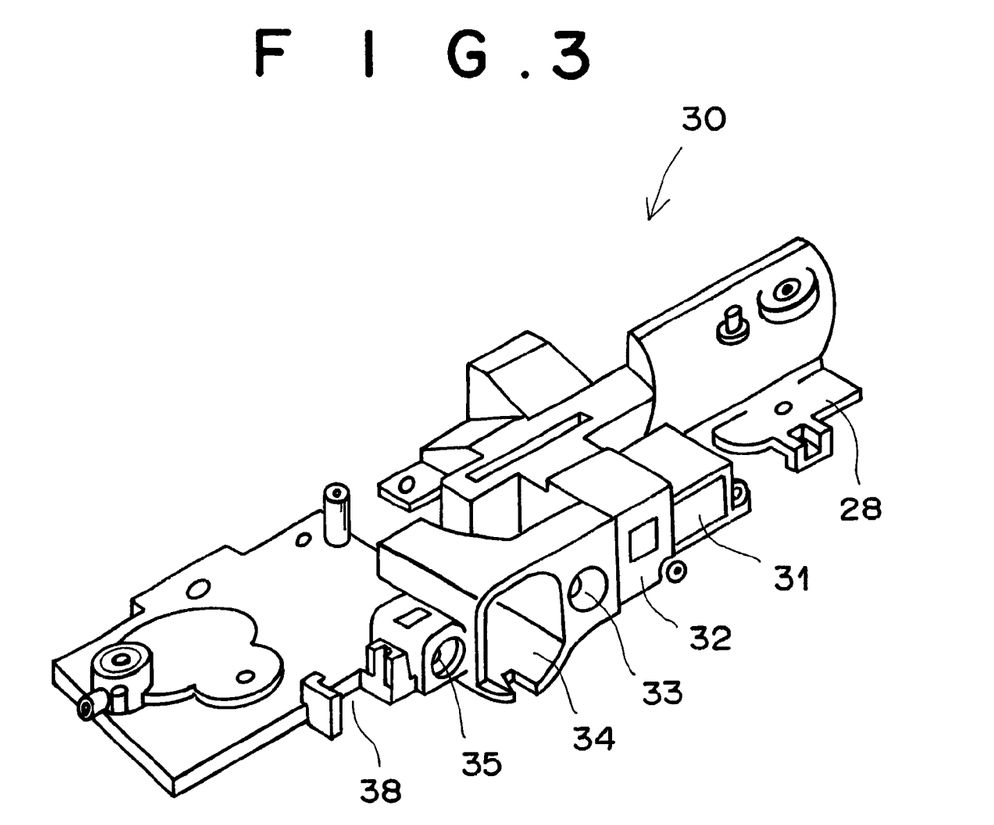
FIG. 3 is a perspective view showing an AF-finder main body supporting frame.

FIG. 1 is a schematic perspective rear view showing a camera, in which an embodiment of the temporary retaining structure for a light projecting device or a light receiving device of an AF apparatus in accordance with the present invention is employed. FIG. 2A is a schematic front view showing a camera main body of the camera of FIG. 1, a front cover of the camera being omitted for clearness. FIG. 2B is a front view of the front cover of the camera of FIG. 1. FIG. 3 is a perspective view showing an AF-finder main body supporting frame.

As illustrated in FIG. 1, surfaces of a horizontally long camera are covered with a back cover 1 and a front cover 20. A top surface of the back cover 1 is provided with a shutter button 2 and a liquid crystal display window 3. Also, an eye-end window 4 of a finder, an operation knob 5 for setting a print size, and the like, are located on the rear surface of the back cover 1.

As illustrated in FIG. 2A, a lens barrel unit 7, which supports a photographing optical system, is located approximately at the center region of a front surface of a camera main body 6. Also, an electronic flashlight section 8 and a photographing condition setting optical system 10 are located above the lens barrel unit 7.

The electronic flashlight section 8 and the photographing condition setting optical system 10 are arrayed in a horizontal line on an AF-finder main body supporting frame 30 shown in FIG. 3. The photographing condition setting optical system 10 comprises an AF light receiving section 11, a finder section 12, a red-eye phenomenon preventing light emitting section 13, an AF light projecting section 14, and an AE light receiving section 15, which are arrayed in this order from the side close to the electronic flashlight section 8. Also, a remote control light receiving section 18 is located on the side outward from the AE light receiving section 15 (i.e., on the side leftward from the AE light receiving section 15 in FIG. 2A).

A printed-circuit board 19 is secured to a position above the photographing condition setting optical system 10. Wires are connected from the printed-circuit board 19 to electric parts of the photographing condition setting optical system 10.

As illustrated in FIG. 2B, the front cover 20 has a circular hole 21, through which the lens barrel unit 7 of the camera main body 6 is projected from the front surface of the camera. The front cover 20 also has a transparent window 22 in front of the electronic flashlight section 8. The front cover 20 further has a horizontally long transparent window 23, which extends over the regions of the AF light receiving section 11 and the finder section 12. The front cover 20 still further has a small circular window 24 for only the red-eye phenomenon preventing light emitting section 13. The front cover 20 also has a horizontally long transparent window 25, which extends over the regions of the AF light projecting section 14, the AE light receiving section 15, and the remote control light receiving section 18. The front cover 20 further has a cut-away area 26 for accommodating the shutter button 2.

With reference to FIG. 3, the AF-finder main body supporting frame 30 is formed through integral molding of a synthetic resin. The AF-finder main body supporting frame 30 is provided with a space 28, in which the electronic flashlight section 8 shown in FIG. 2A is to be located. The AF-finder main body supporting frame 30 is also provided with a housing 31 for accommodating constituent parts of the AF light receiving section 11, a housing 32 for accommodating constituent parts of the finder section 12, a housing 33 for accommodating constituent parts of the red-eye phenomenon preventing light emitting section 13, a housing 34 for accommodating constituent parts of the AF light projecting section 14, and a housing 35 for accommodating constituent parts of the AE light receiving section 15. The part for forming the space 28 and the housings 31 to 35 are formed as an integral body. A space 38, in which the remote control light receiving section 18 is to be located, is formed on the side outward from the housing 35 for accommodating constituent parts of the AE light receiving section 15.

Figure 4:
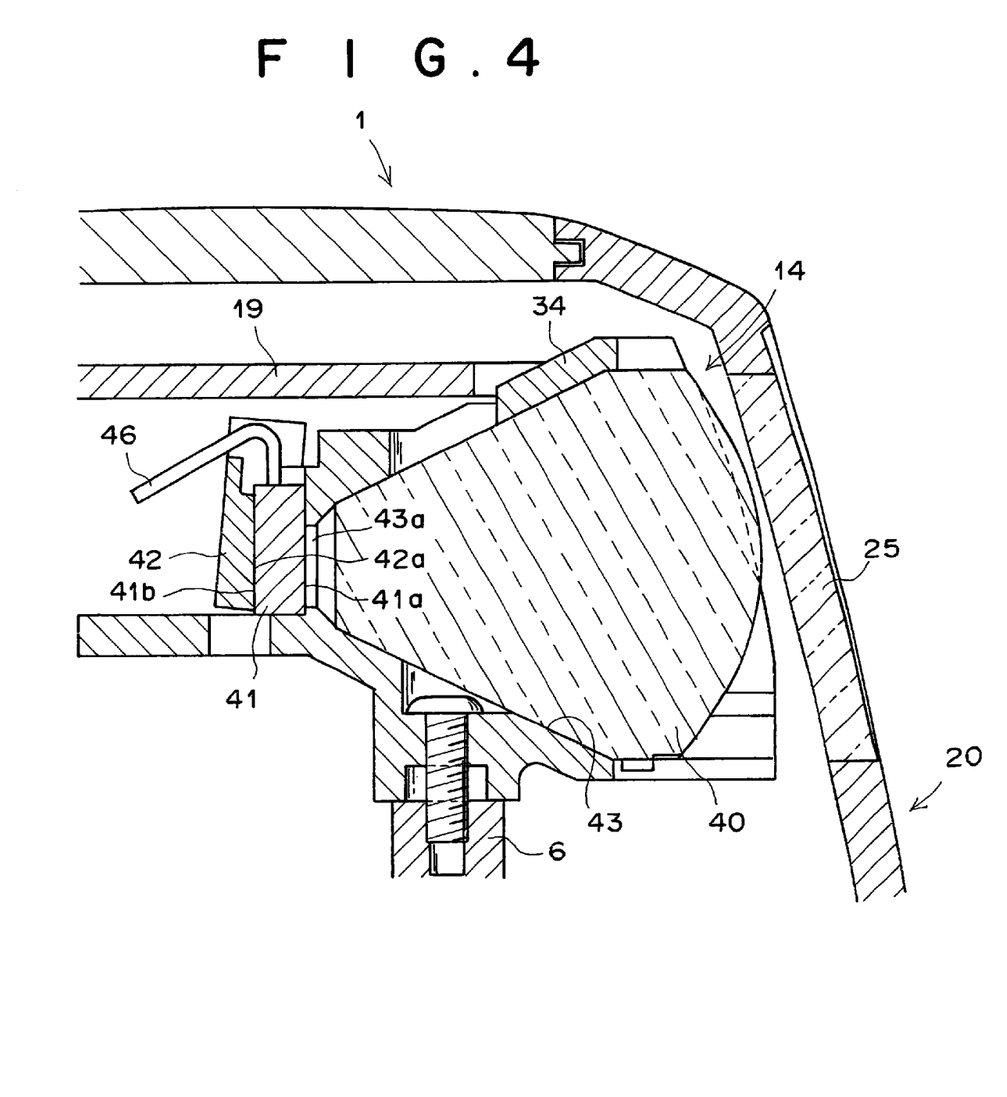
FIG. 4 is an enlarged sectional view showing an AF light projecting section.

FIG. 4 is an enlarged sectional view showing the AF light projecting section 14. As illustrated in FIG. 4, a circular cone-shaped lens 40 is accommodated within the housing 34 of the AF-finder main body supporting frame 30. Also, a light projecting device 41, which is constituted of an infrared light emitting diode (IRED), is held by a retaining piece 42 on the side backward from the lens 40. At the time of the integral molding of the AF-finder main body supporting frame 30, the retaining piece 42 is formed through the integral molding together with the housing 34.

Figure 5:
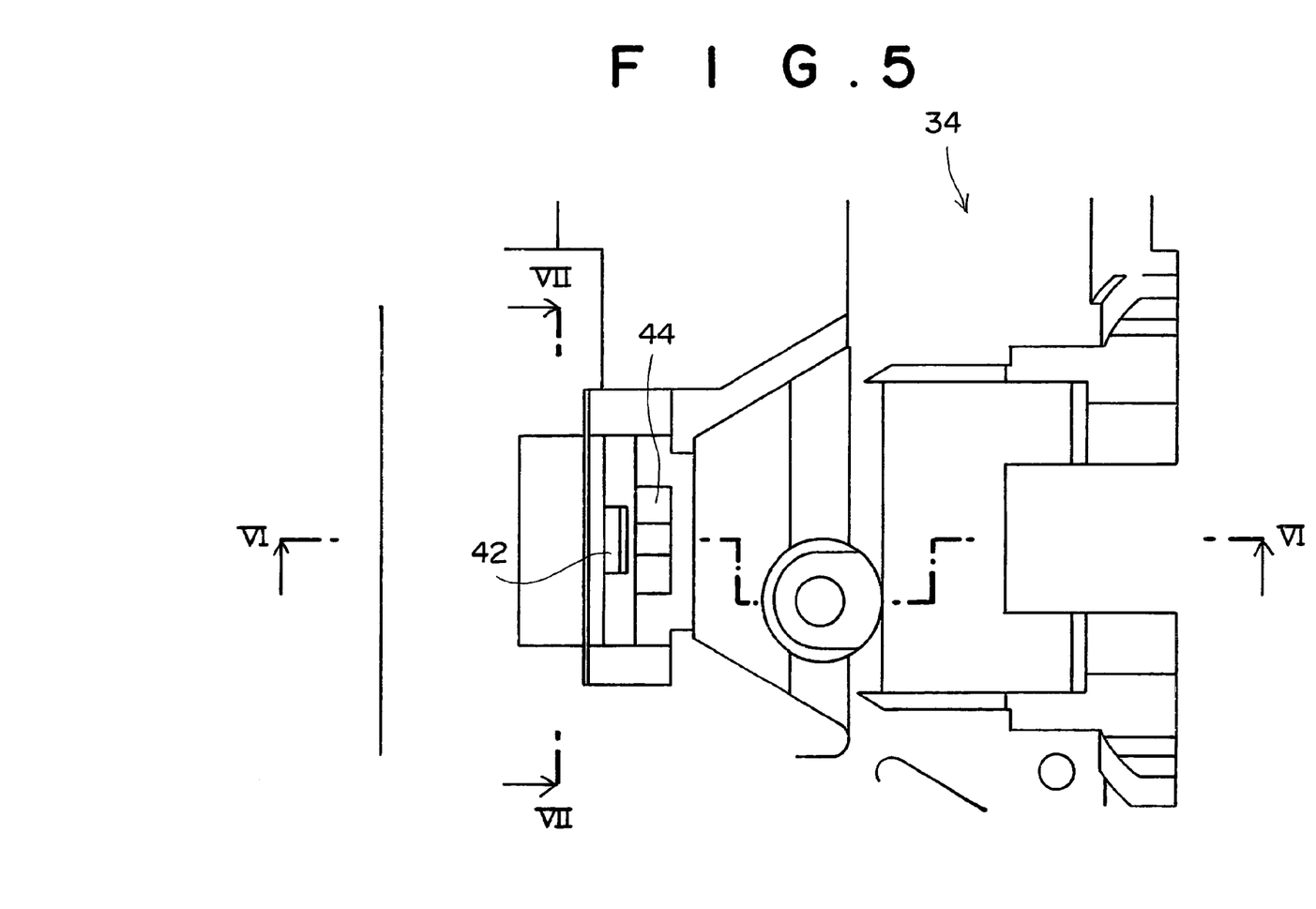
FIG. 5 is a plan view showing a housing for the AF light projecting section.
Figure 6:
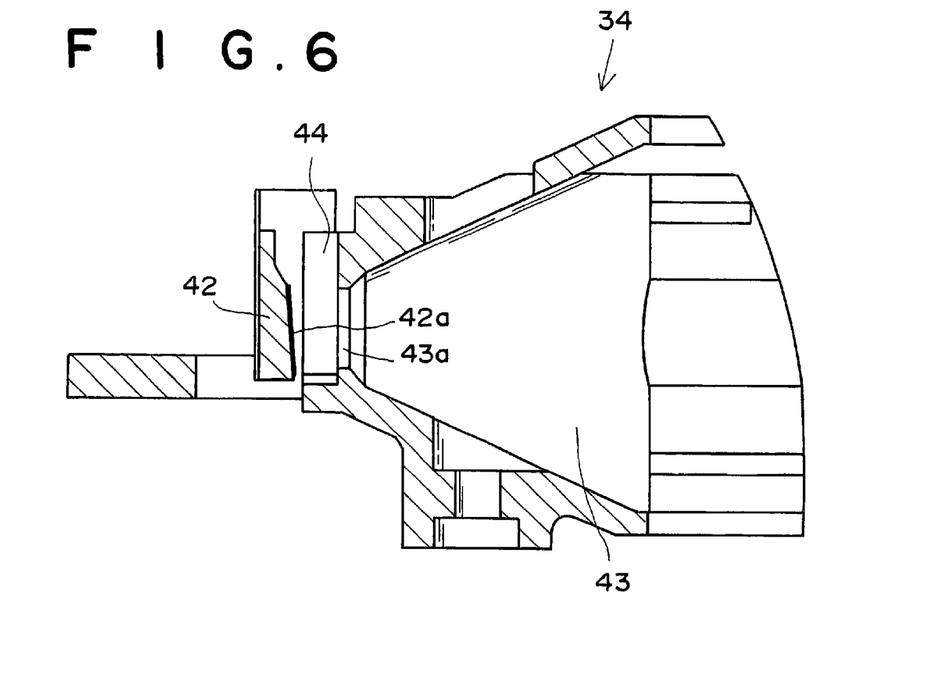
FIG. 6 is a sectional view taken on line VI—VI of FIG. 5.
Figure 7:
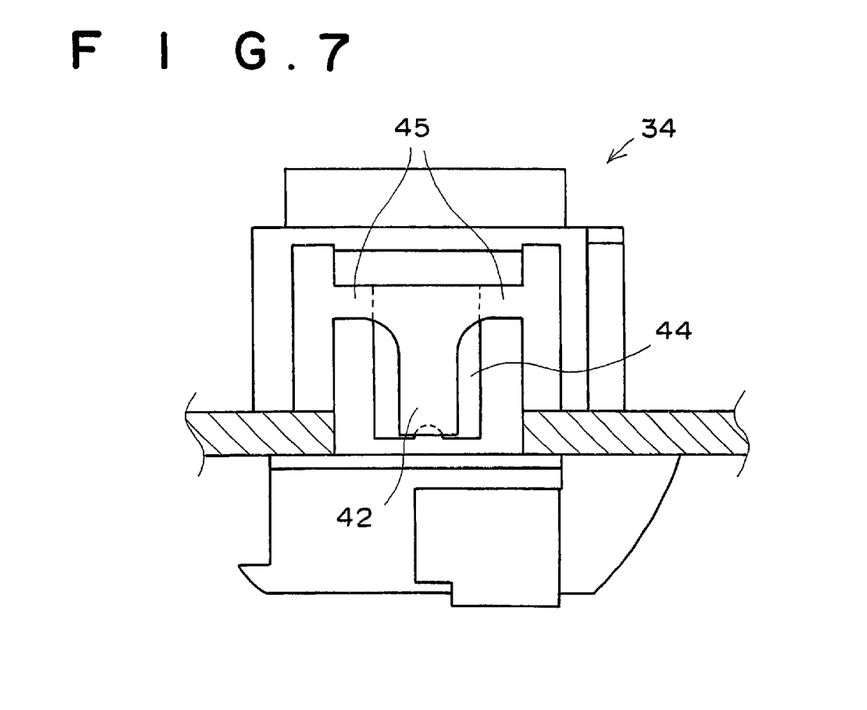
FIG. 7 is a sectional view taken on line VII—VII of FIG. 5.

FIG. 5 is a plan view showing the housing 34 for the AF light projecting section 14. FIG. 6 is a sectional view taken on line VI—VI of FIG. 5. FIG. 7 is a sectional view taken on line VII—VII of FIG. 5.

As illustrated in FIG. 6, the housing 34 is provided with a funnel-shaped opening 43 for accommodating the lens 40 and an opening 44, into which the light projecting device 41 is capable of being inserted from above. The opening 44 communicates with the funnel-shaped opening 43 through a back end section 43a of the funnel-shaped opening 43. As illustrated in FIG. 7, the retaining piece 42 is connected to the housing 34, such that the top portion of the retaining piece 42 is supported by thin supporting sections 45, 45 from the right and left sides. Also, a front surface 42a of the retaining piece 42 constitutes an inclined surface, which is inclined so as to become progressively projected forwardly toward the bottom end.

As illustrated in FIG. 4, the light projecting device 41 is provided with a front surface (a light emitting surface) 41a and a rear surface 41b, which are approximately parallel with each other, and a pair of electric terminals 46, 46. The light projecting device 41 is inserted approximately vertically from above into the opening 44. At an intermediate point of the insertion, the rear surface 41b of the light projecting device 41 comes into abutment with the front surface 42a of the retaining piece 42, and therefore the retaining piece 42 is forcibly deflected backwardly. Accordingly, the supporting sections 45, 45 become twisted, and a reaction force occurs with the retaining piece 42 such that the retaining piece 42 is rotated around the supporting sections 45, 45 in the counter-clockwise direction in FIG. 4. With the reaction force, the front surface 42a of the retaining piece 42 pushes the rear surface 41b of the light projecting device 41. In this manner, as illustrated in FIG. 4, the light projecting device 41 is held at the predetermined position such that the front surface 41a of the light projecting device 41 is pushed against a front wall surface of the opening 44. After the light projecting device 41 has thus been retained temporarily at the predetermined position, an adhesive agent (not shown) is applied from above the opening 44, and the light projecting device 41 is adhered to the housing 34. At this time, until the adhesive agent hardens, the light projecting device 41 is held by the retaining piece 42 at the predetermined position. Therefore, the light projecting device 41 is capable of being prevented from shifting due to shrinkage of the adhesive agent at the time of the hardening of the adhesive agent.

When the light projecting device 41 is combined with the housing 34, the electric terminals 46, 46 extend straightly upwardly from the light projecting device 41. After the light projecting device 41 has been adhered to the housing 34 by the adhesive agent, the electric terminals 46, 46 are bent backwardly a illustrated in FIG. 4.

In the manner described above, the light projecting device 41 is temporarily retained at the predetermined position in the AF light projecting section 14. How a light receiving device 51 is temporarily retained at a predetermined position in the AF light receiving section 11 will be described hereinbelow with reference to FIG. 8 to FIGS. 12A and 12B.

Figure 8:
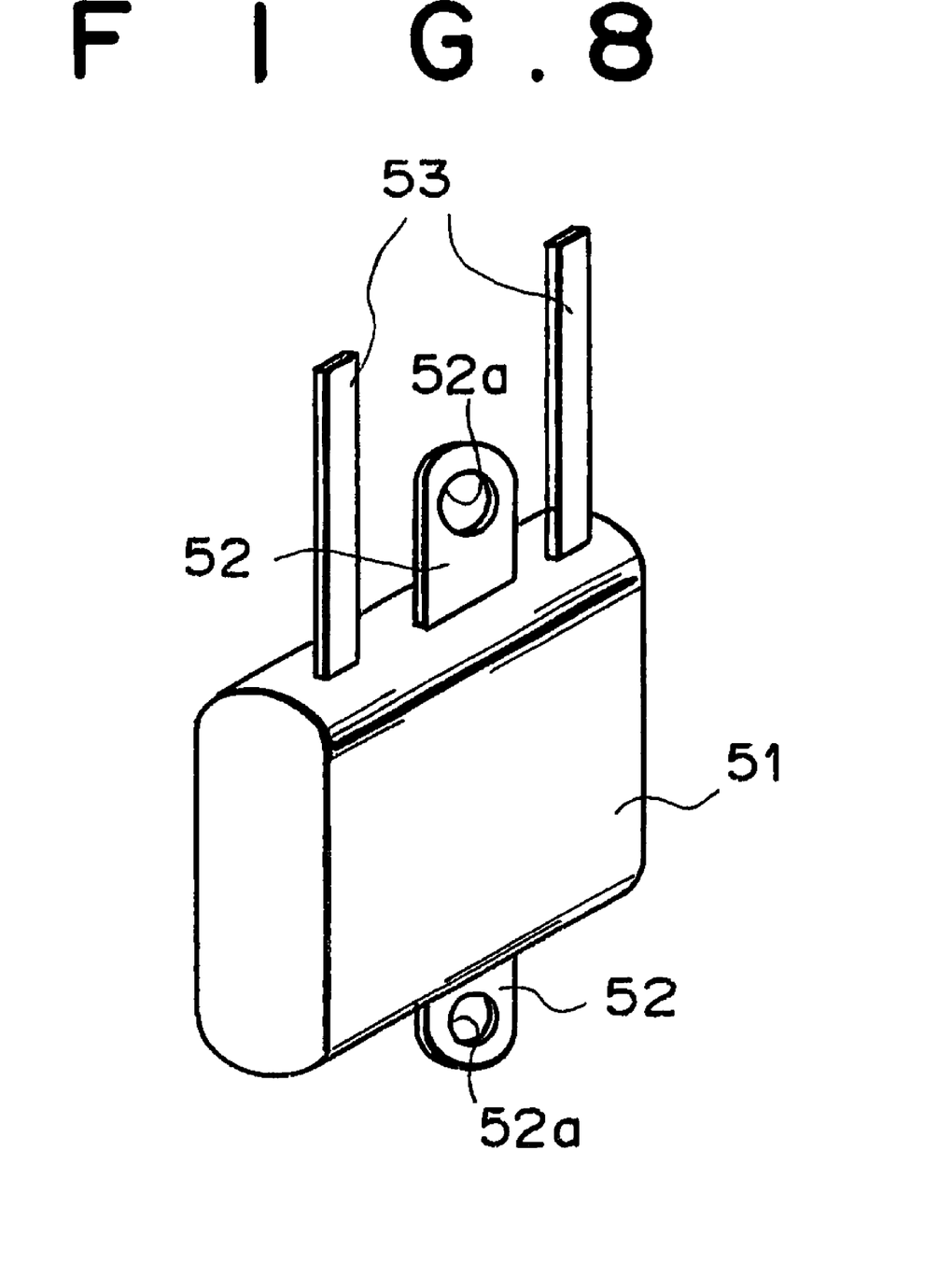
FIG. 8 is a perspective view showing a light receiving device.

FIG. 8 is a perspective view showing the light receiving device 51, which is constituted of a photo position sensor device (PSD). As illustrated in FIG. 8, the light receiving device 51 is provided with mounting terminals 52, 52, which extend respectively from a top surface and a bottom surface of the light receiving device 51. The light receiving device 51 is also provided with a pair of electric terminals 53, 53, which extend upwardly from positions on opposite sides of the upper mounting terminal 52. Each of the mounting terminals 52, 52 has a hole 52a. The light receiving device 51 is fitted previously to a frame-shaped holder 50 as illustrated in FIGS. 9A, 9B, 9C, and 9D and forms a light receiving device unit U.

Figure 9A:
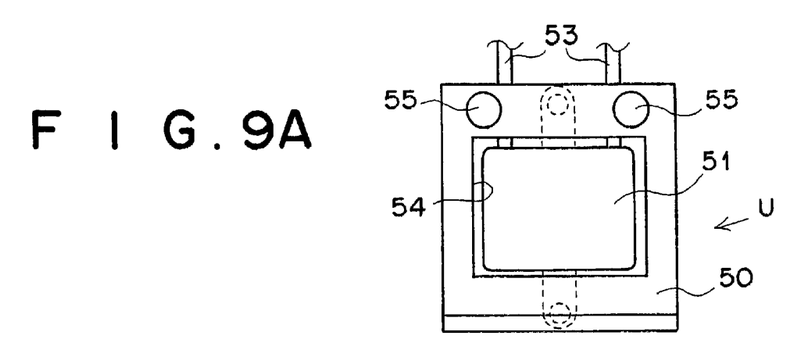
FIG. 9A is a front view showing a light receiving device unit.
Figure 9B:
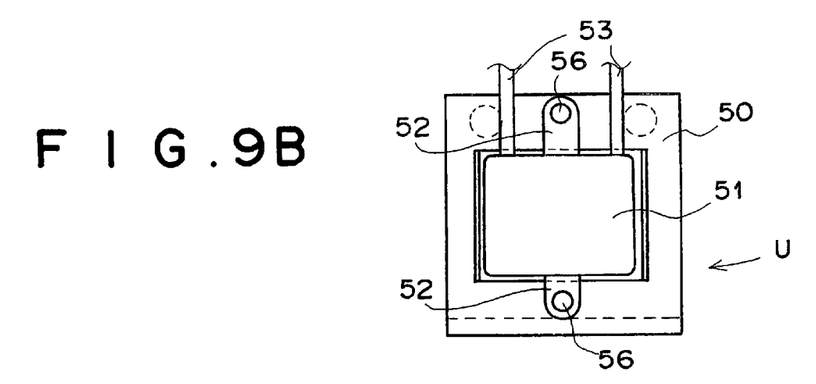
FIG. 9B is a rear view showing the light receiving device unit.
Figure 9C:
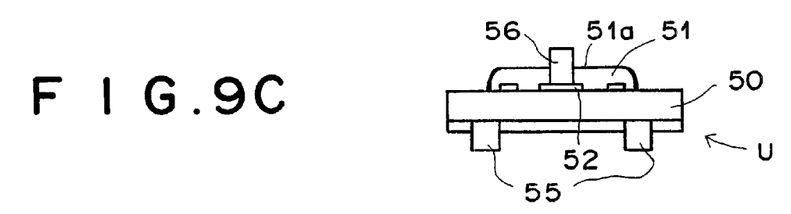
FIG. 9C is a plan view showing the light receiving device unit.
Figure 9D:
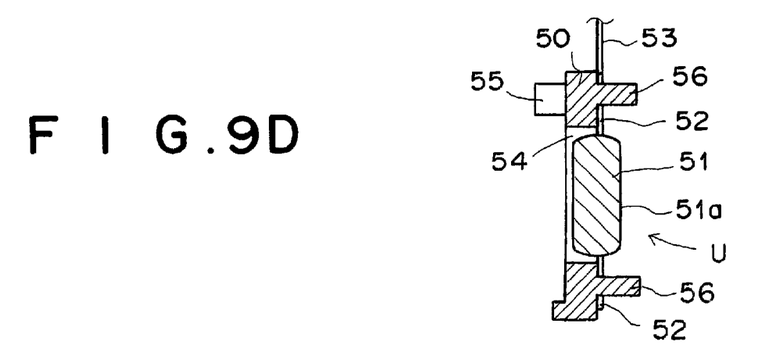
FIG. 9D is a vertical sectional view showing the light receiving device unit.

FIG. 9A is a front view showing the light receiving device unit U. FIG. 9B is a rear view showing the light receiving device unit U. FIG. 9C is a plan view showing the light receiving device unit U. FIG. 9D is a vertical sectional view showing the light receiving device unit U.

As illustrated in FIGS. 9A, 9B, 9C, and 9D, the frame-shaped holder 50 has an opening 54 for accommodating the light receiving device 51. The frame-shaped holder 50 is also provided with a pair of positioning bosses 55, 55, which are arrayed horizontally at a predetermined spacing from each other and are projected forwardly from an upper area of a front surface of the frame-shaped holder 50. The frame-shaped holder 50 is further provided with mounting bosses 56, 56 on a rear surface side. The mounting bosses 56, 56 fit respectively into the holes 52a, 52a of the mounting terminals 52, 52 of the light receiving device 51 in order to support the light receiving device 51. As illustrated in FIGS. 9C and 9D, a rear surface 51a of the light receiving device 51 is projected backwardly from the rear surface of the frame-shaped holder 50.

Figure 10:
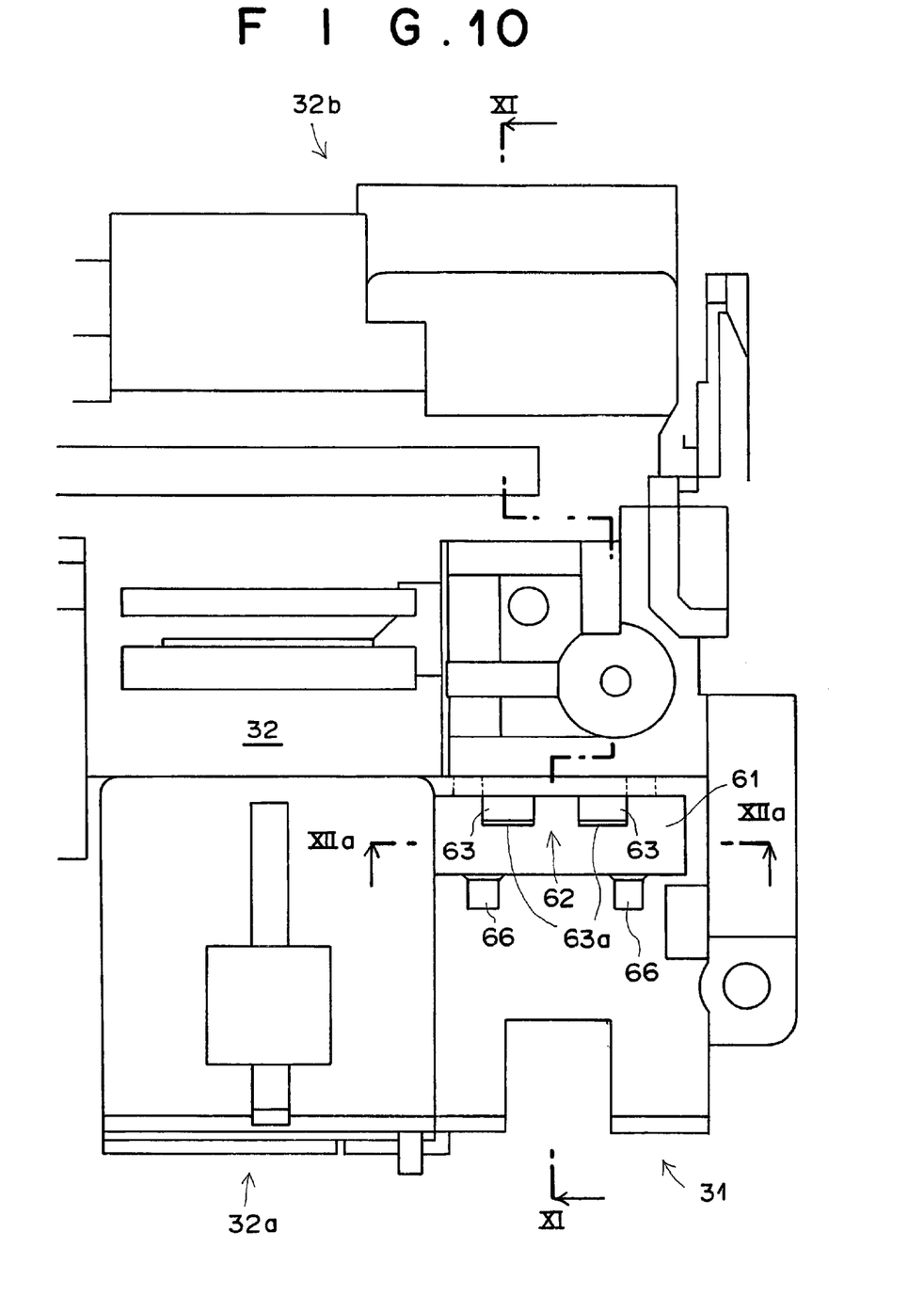
FIG. 10 is a plan view showing a housing for an AF light receiving section and a housing for a finder section.
Figure 11:
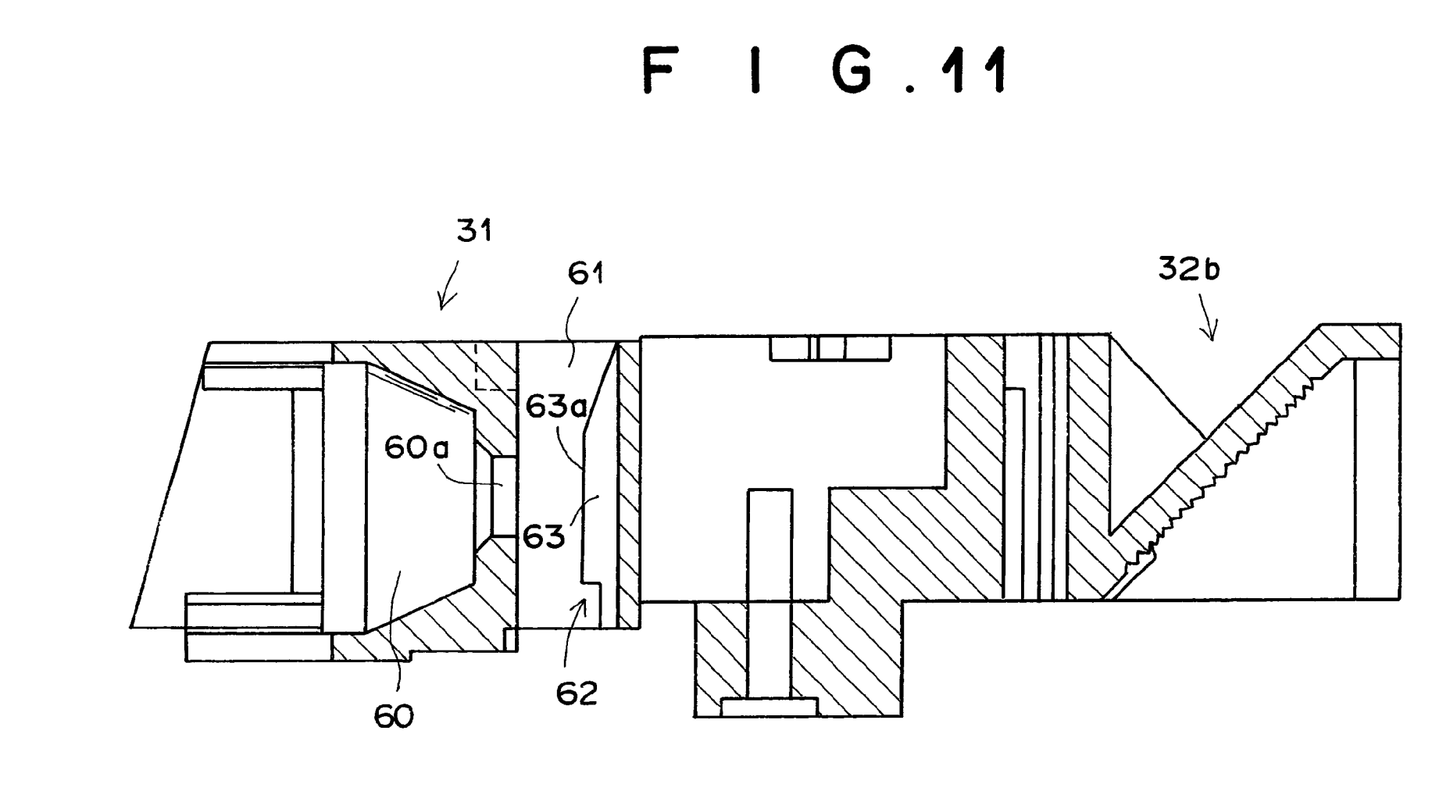
FIG. 11 is a sectional view taken on line XI—XI of FIG. 10.
Figure 12A:
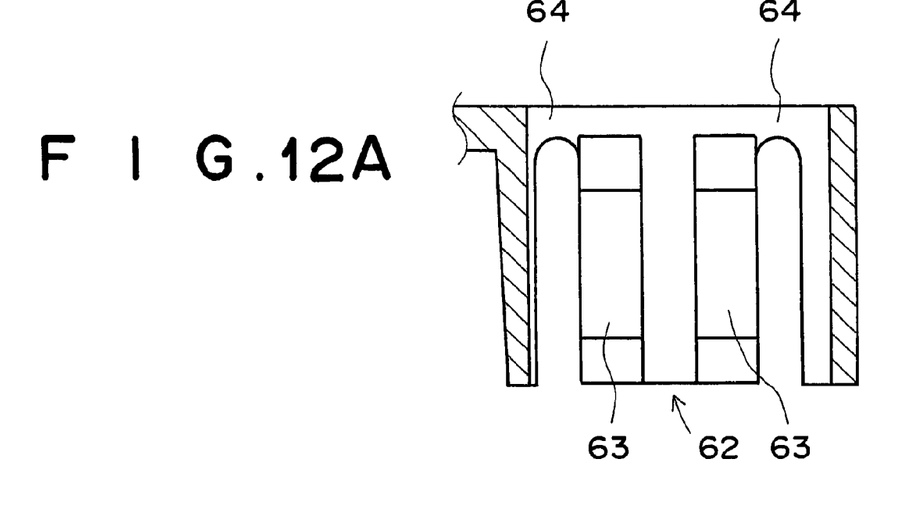
FIG. 12A is a sectional view taken on line XIIa—XIIa of FIG. 10.
Figure 12B:
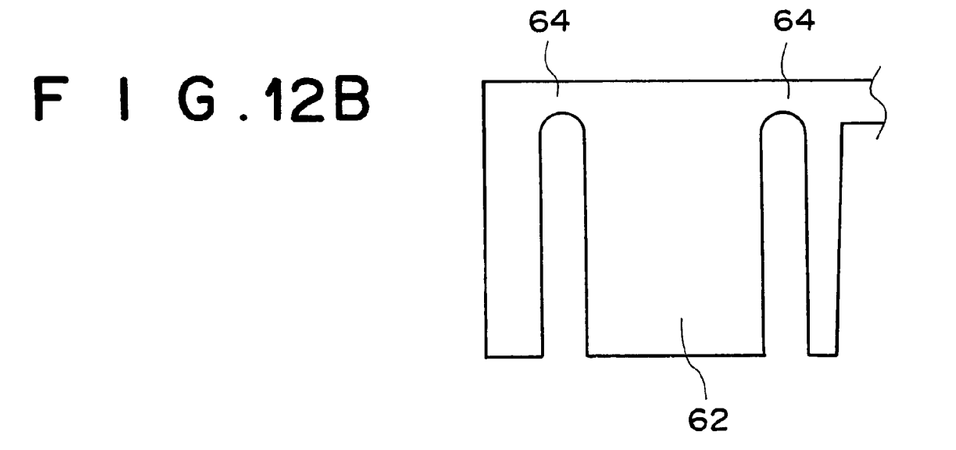
FIG. 12B is a rear view showing a retaining piece.

FIG. 10 is a plan view showing the housing 31 for the AF light receiving section 11 and the housing 32 for the finder section 12. FIG. 11 is a sectional view taken on line XI—XI of FIG. 10. FIG. 12A is a sectional view taken on line XIIa—XIIa of FIG. 10. FIG. 12B is a rear view showing a retaining piece 62.

With reference to FIG. 10, the housing 31 for the AF light receiving section 11 and the housing 32 for the finder section 12 are combined into an integral body. The housing 32 for the finder section 12 is constituted of an objective lens accommodating section 32a, which is located along a side of the housing 31 for the AF light receiving section 11, and a prism and eye-piece accommodating section 32b, which is located on the side backward from the housing 31 for the AF light receiving section 11.

As illustrated in FIG. 11, the housing 31 for the AF light receiving section 11 is provided with a funnel-shaped opening 60 for accommodating a lens (not shown). The housing 31 for the AF light receiving section 11 is also provided with an opening 61, into which the light receiving device unit U described above is capable of being inserted from above.

The opening 61 communicates with the funnel-shaped opening 60 through a back end section 60a of the funnel-shaped opening 60. The retaining piece 62, which has been formed through the integral molding at the time of the molding of the AF-finder main body supporting frame 30, is located on the rear surface side of the opening 61. As illustrated in FIGS. 12A and 12B, the top portion of the retaining piece 62 is supported by thin supporting sections 64, 64 from the right and left sides, such that the retaining piece 62 is capable of swinging horizontally in FIG. 11. Also, a pair of retaining sections 63, 63, which are projected forwardly, are formed on the front surface side of the retaining piece 62. Each of front surfaces 63a, 63a of the retaining sections 63, 63 constitutes an inclined surface, which is inclined so as to become progressively projected forwardly toward the bottom end. Further, as illustrated in FIG. 10, recesses 66, 66, into which the positioning bosses 55, 55 of the frame-shaped holder 50 of the light receiving device unit U described above fit, are formed at a top edge region of the housing 31, which top edge region is located on the side forward from the opening 61.

The light receiving device unit U is inserted approximately vertically from above into the opening 61. At an intermediate point of the insertion, the rear surface 51a of the light receiving device 51 comes into abutment with the front surfaces 63a, 63a of the retaining sections 63, 63 of the retaining piece 62, and therefore the retaining piece 62 is forcibly deflected backwardly. Accordingly, in the same manner as that in the cases of the light projecting device 41, the supporting sections 64, 64 become twisted, and a reaction force occurs with the retaining piece 62 such that the retaining piece 62 is rotated around the supporting sections 64, 64 in the clockwise direction in FIG. 11. With the reaction force, the front surfaces 63a, 63a of the retaining sections 63, 63 push the rear surface 51a of the light receiving device 51. At the same time, the positioning bosses 55, 55 of the frame-shaped holder 50 of the light receiving device unit U fit into the recesses 66, 66 of the housing 31. In this manner, the light receiving device 51 is held at the predetermined position such that the front surface of the light receiving device 51 is pushed against a front wall surface of the opening 61.

After the light receiving device 51 has thus been retained temporarily at the predetermined position, an adhesive agent (not shown) is applied from above the opening 61 and the recesses 66, 66, and the light receiving device 51 is adhered to the housing 31 together with the frame-shaped holder 50. At this time, until the adhesive agent hardens, the light receiving device 51 is held by the retaining piece 62 at the predetermined position. Therefore, the light receiving device 51 is capable of being prevented from shifting due to shrinkage of the adhesive agent at the time of the hardening of the adhesive agent.

As described above, with the embodiment of the temporary retaining structure for a light projecting device or a light receiving device of an AF apparatus in accordance with the present invention, the retaining piece 42 capable of elastically holding the light projecting device 41, which is inserted into and combined with the housing 34, at the predetermined position is formed as an integral body together with the housing 34 at the time of the molding of the AF-finder main body supporting frame 30. Also, the retaining piece 62 capable of elastically holding the light receiving device 51, which is inserted into and combined with the housing 31, at the predetermined position is formed as the integral body together with the housing 31 at the time of the molding of the AF-finder main body supporting frame 30. Therefore, a particular independent retaining member, such as a leaf spring, need not be utilized, and the light projecting device 41 and the light receiving device 51 are capable of being prevented from shifting from the predetermined positions due to the shrinkage of the adhesive agent at the time of the hardening of the adhesive agent.

Also, with the embodiment of the temporary retaining structure for a light projecting device or a light receiving device of an AF apparatus in accordance with the present invention, even in cases where the prism and eye-piece accommodating section 32b for accommodating the prism and the eye-piece of the finder section 12 is located on the side backward from the section for mounting the light receiving device 51, the structure of the AF-finder main body supporting frame 30 may be set such that the light projecting device 41 and the light receiving device 51 are combined with the AF-finder main body supporting frame 30 from above the AF-finder main body supporting frame 30, and the retaining piece 42 and the retaining piece 62 are thereby capable of being formed through the integral molding together with the AF-finder main body supporting frame 30.

In the embodiment described above, the temporary retaining structure in accordance with the present invention is applied to the camera provided with the active type of the AF apparatus. However, the temporary retaining structure in accordance with the present invention is also applicable as a structure for temporary retaining a light receiving device of a camera provided with a passive type of AF apparatus having no light projecting device.

What is claimed is:

1. A temporary retaining structure for a light projecting device or a light receiving device of an automatic focusing apparatus for use in a camera provided with an instrument supporting frame, with which a light projecting device or a light receiving device of an automatic focusing apparatus are combined at a predetermined position, wherein a retaining piece, which is capable of elastically pushing and holding the light projecting device or the light receiving device at the predetermined position, is formed through integral molding together with the instrument supporting frame.

2. A temporary retaining structure for a light projecting device or a light receiving device of an automatic focusing apparatus as defined in claim 1 wherein the light projecting device or the light receiving device is held by the retaining piece at the predetermined position, and the light projecting device or the light receiving device is adhered in this state to the instrument supporting frame by use of an adhesive agent.

* * * * *